United States Patent
Liu et al.

(10) Patent No.: US 11,804,615 B2
(45) Date of Patent: *Oct. 31, 2023

(54) MEMBRANE ELECTRODE ASSEMBLY FOR REDOX FLOW BATTERY APPLICATIONS

(71) Applicant: UOP LLC, Des Plaines, IL (US)

(72) Inventors: Chunqing Liu, Arlington Heights, IL (US); Xueliang Dong, Schaumburg, IL (US); Jinfeng Wu, Kildeer, IL (US); Stuart R. Miller, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,217

(22) Filed: Oct. 18, 2021

(65) Prior Publication Data

US 2023/0118977 A1    Apr. 20, 2023

(51) Int. Cl.
*H01M 8/1004* (2016.01)
*H01M 8/18* (2006.01)
(Continued)

(52) U.S. Cl.
CPC ..... *H01M 8/1004* (2013.01); *H01M 8/04171* (2013.01); *H01M 8/1062* (2013.01); *H01M 8/188* (2013.01); *H01M 2008/1095* (2013.01)

(58) Field of Classification Search
CPC ..... H01M 8/10–1004; H01M 8/04171; H01M 8/1058–1062; H01M 8/18–188;
(Continued)

(56) References Cited

U.S. PATENT DOCUMENTS

| 2012/0183877 A1 | 7/2012 | Houghtaling et al. |
| 2015/0140439 A1* | 5/2015 | Hasegawa ........... H01M 50/449 |
| | | 524/45 |

(Continued)

FOREIGN PATENT DOCUMENTS

| CN | 102867928 A | 1/2013 |
| EP | 2590250 A1 | 5/2013 |

(Continued)

OTHER PUBLICATIONS

Yin et al., "Preparation of cellulose acetate/PP composite membrane for vanadium redox flow battery applications," Rare Metals vol. 30, Spec. Issue, Mar. 2011, p. 22-26. (Year: 2011).*

Skyllas-Kazacos, M. et al, Chapter 12 on Redox Flow Batteries for Medium- to Large-Scale Energy Storage in Electricity Transmission, Distribution and Storage Systems, A volume in Woodhead Publishing Series in Energy, 2013. (DOI: 10.1533/9780857097378.3.398).

(Continued)

*Primary Examiner* — William E McClain
*Assistant Examiner* — Bethany C Bouchard (57) ABSTRACT

Low cost membrane electrode assemblies (MEA) with improved coulombic efficiency (CE), reduced maintenance cost, and improved deliverable capacity have been developed for redox flow batteries and other electrochemical reaction applications. The MEA comprises: a microporous substrate membrane, first and second hydrophilic ionomeric polymer coating layers on surfaces of the microporous substrate membrane, and an electrode adhered to a second surface of the second hydrophilic ionomeric polymer coating layer. Methods of preparing the MEA and a redox flow battery system incorporating the MEA are also described.

20 Claims, 1 Drawing Sheet

(51) Int. Cl.
  *H01M 8/1062* (2016.01)
  *H01M 8/10* (2016.01)
  *H01M 8/04119* (2016.01)
(58) Field of Classification Search
  CPC . H01M 50/40–497; H01M 50/46–461; H01M 2008/1095; Y02E 60/10; C09J 5/04; C09J 101/00–26; C09J 105/00–16
  See application file for complete search history.

(56) References Cited

U.S. PATENT DOCUMENTS

| | | | | |
|---|---|---|---|---|
| 2018/0351192 | A1* | 12/2018 | Lee | H01M 8/1053 |
| 2019/0181461 | A1 | 6/2019 | Weber et al. | |
| 2020/0168937 | A1 | 5/2020 | Ahn et al. | |
| 2022/0134292 | A1* | 5/2022 | Liu | H01M 8/188 |
| | | | | 429/249 |

FOREIGN PATENT DOCUMENTS

| | | |
|---|---|---|
| JP | H06260183 A | 9/1994 |
| KR | 20200061101 A | 6/2020 |
| WO | 2016132249 A1 | 8/2016 |
| WO | 2019225873 A1 | 11/2019 |

OTHER PUBLICATIONS

Lu, Shanfu et al., Layer-by-layer self-assembly of Nafion-[CS-PWA] composite membranes with suppressed vanadium ion crossover for vanadium redox flow battery applications, RSC Adv., 2014, 4, 24831.

Zhao, Yuyue et al., The porous membrane with tunable performance for vanadium flow battery: The Effect of charge, Journal of Power Sources, 342 (2017) 327-334.

Zhao, Chengji et al., Layer-by-layer self-assembly of polyaniline on sulfonated poly(arylene ether ketone) membrane with high proton conductivity and low methanol crossover, International Journal of Hydrogen Energy 35 (2010) 10482-10488.

International Search Report from corresponding PCT application No. PCT/US2022/078049 dated Feb. 1, 2023.

Written Opinion from corresponding PCT application No. PCT/US2022/078049 completed on Jan. 31, 2023.

Arunachalam, Muthumeenal et al., High performance of anion exchange blend membranes based on novel phosphonium cation polymers for all-vanadium redox flow battery applications, ACS Applied Matierals & Interfaces, 2021, vol. 13, pp. 45935-45943 (published Sep. 17, 2021).

* cited by examiner

MEMBRANE ELECTRODE ASSEMBLY FOR REDOX FLOW BATTERY APPLICATIONS

BACKGROUND

Redox flow batteries (RFBs) comprise two external storage tanks filled with active materials comprising metal ions that may be in different valance states, two circulation pumps, and a flow cell with a separation membrane and two electrodes. The separation membrane is located between the anode and the cathode and is used to separate the anolyte and the catholyte, as well as to utilize the current circuit by allowing the transfer of balancing ions. The anolyte, catholyte, anode, and cathode may also be referred to as plating electrolyte or negative electrolyte, redox electrolyte or positive electrolyte, plating electrode or negative electrode, and redox electrode or positive electrode respectively. Among all the redox flow batteries developed to date, all vanadium redox flow batteries (VRFB) have been the most extensively studied. VRFB uses the same vanadium element in both half cells which prevents crossover contamination of electrolytes from one half cell to the other half cell. VRFB, however, is inherently expensive due to the use of high-cost vanadium and an expensive membrane. All-iron redox flow batteries (IFB) are particularly attractive for grid scale storage applications due to the use of low cost and abundantly available iron, salt, and water as the electrolyte and the non-toxic nature of the system. IFBs have iron in different valence states as both the positive and negative electrolytes for the positive and negative electrodes, respectively. The iron-based positive and negative electrolyte solutions stored in the external storage tanks flow through the stacks of the batteries. The cathode side half-cell reaction involves $Fe^{2+}$ losing electrons to form $Fe^{3+}$ during charge and $Fe^{3+}$ gaining electrons to form $Fe^{2+}$ during discharge; the reaction is given by Equation 1. The anode side half-cell reaction involves the deposition and dissolution of iron in the form of a solid plate; the reaction is given by Equation 2. The overall reaction is shown in Equation 3.

Redox electrode: $2Fe^{2+} \leftrightarrow Fe^{3+} 2e^- +0.77V$ (1)

Plating electrode: $Fe^{2+} + 2e^- \leftrightarrow Fe^0 -0.44V$ (2)

Total: $3Fe^{2+} \leftrightarrow Fe^0 + 2Fe^{3+} 1.21V$ (3)

The membrane is one of the key materials that make up a battery or electrolysis cell and is an important driver for safety and performance. Some important properties for membranes for flow batteries, fuel cells, and membrane electrolysis include high conductivity, high ionic permeability (porosity, pore size and pore size distribution), high ionic exchange capacity (for ion-exchange membrane), high ionic/electrolyte selectivity (low permeability/crossover to electrolytes), low price (less than $150-200/m²), low area resistance to minimize efficiency loss resulting from ohmic polarization, high resistance to oxidizing and reducing conditions, chemically inert to a wide pH range, high thermal stability together with high proton conductivity (greater than or equal to 120° C. for fuel cell), high proton conductivity at high T without $H_2O$, high proton conductivity at high T with maintained high RH, and high mechanical strength (thickness, low swelling).

The membrane is ionically conductive. The ionic conductivity means that the membrane can transport the charge-carrying ions, such as protons or ammonium ion ($NH_4^+$), from one side of the membrane to the other side of the membrane to maintain the electric circuit. The electrical balance is achieved by the transport of charge-carrying ions (such as protons, ammonium ions, potassium ions, or sodium ions in all iron redox flow battery system) in the electrolytes across the membrane during the operation of the battery cell. The ionic conductivity ($\sigma$) of the membrane is a measure of its ability to conduct charge-carrying ions, and the measurement unit for conductivity is Siemens per meter (S/m). The ionic conductivity ($\sigma$) of the ionically conductive membrane is measured by determining the resistance (R) of the membrane between two electrodes separated by a fixed distance. The resistance is determined by electrochemical impedance spectroscopy (EIS) and the measurement unit for the resistance is Ohm ($\Omega$). The membrane area specific resistance (RA) is the product of the resistance of the membrane (R) and the membrane active area (A) and the measurement unit for the membrane area specific resistance is ($\Omega \cdot cm^2$). The membrane ionic conductivity ($\sigma$, S/cm) is proportional to the membrane thickness (L, cm) and inversely proportional to the membrane area specific resistance (RA, $\Omega \cdot cm^2$).

The performance of the RFB is evaluated by several parameters including area specific resistance, numbers of battery charge/discharge cycling, electrolyte crossover through the membrane, voltage efficiency (VE), coulombic efficiency (CE), and energy efficiency (EE) of the RFB cell. CE is the ratio of a cell's discharge capacity divided by its charge capacity. A higher CE, indicating a lower capacity loss, is mainly due to the lower rate of crossover of electrolyte ions, such as ferric and ferrous ions, through the membrane and reduced $H_2$ evolution reaction during charging in the iron redox flow battery system. VE is defined as the ratio of a cell's mean discharge voltage divided by its mean charge voltage (See M. Skyllas-Kazacos, C. Menictas, and T. Lim, Chapter 12 on Redox Flow Batteries for Medium- to Large-Scale Energy Storage in *Electricity Transmission, Distribution and Storage Systems*, A volume in Woodhead Publishing Series in Energy, 2013). A higher VE, indicating a higher ionic conductivity, is mainly due to the low area specific resistance of the battery system. EE is the product of VE and CE and is an indicator of energy loss in charge-discharge processes. EE is a key parameter to evaluate an energy storage system.

One issue for the current all iron RFB system is the high area specific resistance that results in low VE. The area specific resistance is the combination of the resistances from the membrane, the current collectors, the end plates, the electrolytes, the reactions, the interfacial resistance, and other components. Another issue is the loss of capacity in all iron RFB due to the undesired crossover of water and Fe ions through the membrane. Yet another issue is the $H_2$ evolution reaction during charging. $H_2$ is formed on the negative side of the battery as $Fe^{2+}$ is plated on the electrode as $Fe^0$, which will result in low CE. As battery is charging, hydrogen is formed on the negative side of the battery as $Fe^{2+}$ is plated on the electrode as $Fe^0$. Meanwhile, losses are minimal on positive side. Therefore, there is more $Fe^{3+}$ in the positive solution for each cycle until there is no more $Fe^{2+}$ available for charging the battery. The formation of $H_2$ resulted in low CE.

$(-)Fe^{2+} + 2e^- \rightarrow Fe^0(s) E^0 = -0.44V$ $(-)2H^+ + 2e^- \rightarrow H_2(g) E^0 = 0.00V$ $(+)2Fe^{2+} \rightarrow 2Fe^{2+} + 2e^-$ Therefore, there is a need for improved membranes for use in RFB systems, and for methods of making them.

DESCRIPTION OF THE INVENTION

Figure 1:
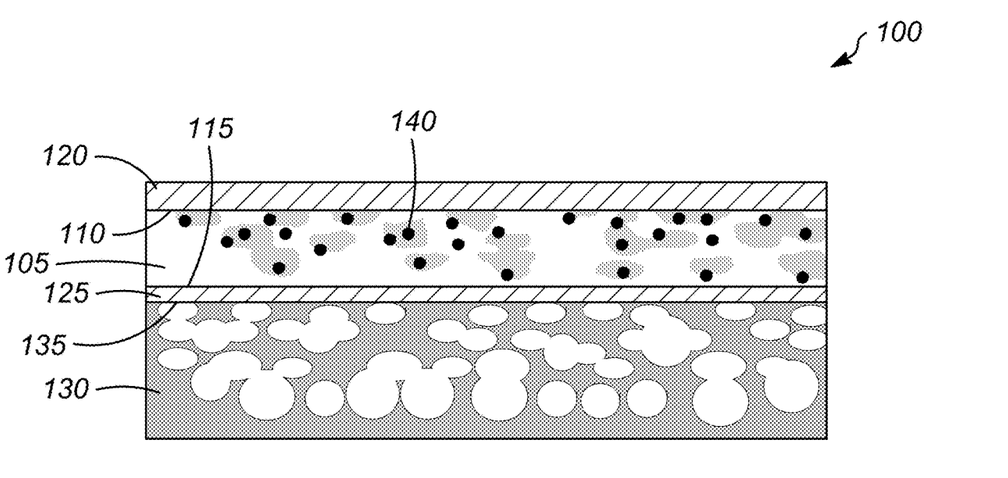
The FIGURE is an illustration of one embodiment of the membrane electrode assembly (MEA).

A new low cost membrane electrode assembly (MEA) has been developed for redox flow batteries and other electrochemical reaction applications. The MEA has reduced the area specific resistance and therefore improves the ionic conductivity. In addition, the new membrane electrode assembly includes a hydrophilic ionomeric polymer as the "adhesive" between the membrane and the anode which improves the hydrophilicity of the membrane. It also reduces electrolyte crossover from the positive electrolyte solution to the negative electrolyte solution. This results in improved CE, reduced maintenance cost, and improved deliverable capacity.

One aspect of the invention is an MEA. In one embodiment, the MEA comprises: a microporous support membrane, first and second hydrophilic ionomeric polymer coating layers on surfaces of the microporous support membrane, and an electrode adhered to a second surface of the second hydrophilic ionomeric polymer coating layer.

The first and/or second hydrophilic ionomeric polymers may comprise any hydrophilic ionomeric polymers. Suitable first and/or second hydrophilic ionomeric polymers include, but are not limited to, a polysaccharide polymer, a poly(acrylic acid) polymer, a poly(methacrylic acid), or combinations thereof.

Suitable hydrophilic ionomeric polymers include, but are not limited to, a polysaccharide polymer, a polyphosphoric acid-complexed polysaccharide polymer, a polyphosphoric acid and metal ion-complexed polysaccharide polymer, a metal ion-complexed polysaccharide polymer, a boric acid-complexed polysaccharide polymer, a boric acid-complexed polyvinyl alcohol polymer, polyphosphoric acid-complexed polyvinyl alcohol polymer, a polyphosphoric acid and metal ion-complexed polyvinyl alcohol polymer, a metal ion-complexed polyvinyl alcohol polymer, a metal ion-complexed poly(acrylic acid) polymer, a boric acid-complexed poly(acrylic acid) polymer, a metal ion-complexed poly(methacrylic acid), a boric acid-complexed poly(methacrylic acid), or combinations thereof.

Suitable metal ions for complexing the polymers include, but are not limited to ferric ions, ferrous ions, zinc ions, or vanadium ions.

Suitable polysaccharide polymers include, but are not limited to, chitosan, sodium alginate, potassium alginate, calcium alginate, ammonium alginate, alginic acid, sodium hyaluronate, potassium hyaluronate, calcium hyaluronate, ammonium hyaluronate, hyaluronic acid, dextran, pullulan, carboxymethyl curdlan, sodium carboxymethyl curdlan, potassium carboxymethyl curdlan, calcium carboxymethyl curdlan, ammonium carboxymethyl curdlan, κ-carrageenan, λ-carrageenan, ι-carrageenan, carboxymethyl cellulose, sodium carboxymethyl cellulose, potassium carboxymethyl cellulose, calcium carboxymethyl cellulose, ammonium carboxymethyl cellulose, pectic acid, chitin, chondroitin, xanthan gum, or combinations thereof.

In some embodiments, at least one of the first and second hydrophilic ionomeric polymers comprises a polyphosphoric acid-complexed chitosan polymer, a polyphosphoric acid and metal ion-complexed chitosan polymer, a metal ion-complexed alginic acid polymer, a sodium alginate polymer, an alginic acid polymer, a hyaluronic acid polymer, a poly(acrylic acid) polymer, a poly(methacrylic acid) polymer, or combinations thereof.

In some embodiments, at least one of the first and second hydrophilic ionomeric polymers is a boric acid-complexed polyvinyl alcohol polymer, a boric acid-complexed alginic acid, or a blend of boric acid-complexed polyvinyl alcohol and alginic acid polymer.

The microporous support membrane should have good thermal stability (stable up to at least 100° C.), high aqueous and organic solution resistance (insoluble in aqueous and organic solutions) under low pH condition (e.g., pH less than 6), high resistance to oxidizing and reducing conditions (insoluble and no performance drop under oxidizing and reducing conditions), high mechanical strength (no dimensional change under the system operation conditions), as well as other factors dictated by the operating conditions for energy storage applications. The microporous support membrane must be compatible with the cell chemistry and meet the mechanical demands of cell stacking or winding assembly operations. The microporous support membrane has high ionic conductivity but low selectivity of charge-carrying ions such as protons, hydrated protons, chloride ions, potassium ions, hydrated potassium ions, sodium ions, and hydrated sodium ions over the electrolytes such as ferric ions, hydrated ferric ions, ferrous ions, and hydrated ferrous ions.

The microporous support membrane may comprise any suitable support membrane. The microporous support membrane comprises polyethylene, polypropylene, poly(ethylene-co-propylene), polyamide, polyacrylonitrile, polyethersulfone, sulfonated polyethersulfone, polysulfone, sulfonated polysulfone, poly(ether ether ketone), sulfonated poly(ether ether ketone), polyester, cellulose acetate, cellulose triacetate, polybenzimidazole, polyimide, polyvinylidene fluoride, polycarbonate, cellulose, or combinations thereof.

The polymers suitable for the preparation of the microporous support membrane can be selected from, but not limited to, polyolefins such as polyethylene, polypropylene, and poly(ethylene-co-propylene), polyamide such as Nylon 6 and Nylon 6,6, polyacrylonitrile, polyethersulfone, sulfonated polyethersulfone, polysulfone, sulfonated polysulfone, poly(ether ether ketone), sulfonated poly(ether ether ketone), polyester, cellulose acetate, cellulose triacetate, polybenzimidazole, polyimide, polyvinylidene fluoride, polycarbonate, cellulose, or combinations thereof. These polymers provide a range of properties such as low cost, high stability in water and electrolytes under a wide range of pH, good mechanical stability, and ease of processability for membrane fabrication.

The microporous support membrane can have either a symmetric porous structure or an asymmetric porous structure. The asymmetric microporous support membrane can be formed by a phase inversion membrane fabrication approach followed by direct air drying, or by phase inversion followed by solvent exchange methods. The microporous support membrane also can be fabricated via a dry processing of thermoplastic polyolefins or a wet processing of thermoplastic olefins. The dry processing of thermoplastic polyolefins utilizes extrusion to bring the polymer above its melting point and form it into the desired shape. Subsequent annealing and stretching processes may also be done to increase the crystallinity and orientation and dimension of the micropores. The wet processing of polyolefin separators is done with the aid of a hydrocarbon liquid or low molecular weight oil mixed with the polymer resin or a mixture of the polymer resin and inorganic nanoparticles in the melt phase. The melt mixture is extruded through a die similar to the dry processed separators. The thickness of the microporous support membrane can be in a range of 10-1000 micrometers, or a range of 10-900 micrometers, or a range of 10-800 micrometers, or a range of 10-700 micrometers, or a range of 10-600 micrometers, or a range of 10-500 micrometers, or a range of 20-500 micrometers. The pore size of the microporous membrane can be in a range of 10 nanometers to 50 micrometers, or a range of 50 nanometers to 10 micrometers, or a range of 0.2 micrometers to 1 micrometer.

The first and second hydrophilic ionomeric polymers may be the same, or the polymers may be different.

The first and/or second hydrophilic ionomeric polymers may be present in the micropores of the support membrane Another aspect of the invention involve methods of making the membrane electrode assembly (MEA). In one embodiment, the method includes applying a first layer of an aqueous solution comprising a first hydrophilic ionomeric polymer to a first surface of a microporous support membrane, drying the coated membrane, applying a second layer of an aqueous solution comprising a second hydrophilic ionomeric polymer to a second surface of the microporous support membrane, applying an anode to the second layer while the second layer is wet, drying the membrane electrode assembly, and optionally, treating the dried membrane electrode assembly with an acid solution and rinse with deionized water.

The first and/or second hydrophilic ionomeric polymers may be the same polymers described above.

The first layer of aqueous solution comprising the first hydrophilic ionomeric polymer and/or the second layer of an aqueous solution comprising the second hydrophilic ionomeric polymer may be applied by any suitable method. Suitable methods of application include, but are not limited to, dip coating, spray coating, meniscus/slot die coating, brushing, roller coating, metering rod/Meyer bar coating, knife casting, and the like.

The first and/or the second layer of hydrophilic ionomeric polymer can be dried at a temperature in a range of about 40° C. to about 120° C., or about 50° C. to about 100° C.

The coated membrane may be treated with an acid solution for about 10 min to about 48 h, or about 1 h to about 24 h, or about 1 h to about 12 h, at a temperature in a range of about 20° C. to about 80° C., or about 20° C. to about 60° C., and the membrane may be rinsed with deionized water after drying the coated membrane and before applying the second layer of the aqueous solution. The treatment of the coated membrane in the acid solution either converts the water soluble polymer coating layer into a water insoluble polymer coating layer or a water insoluble acid-complexed polymer coating layer. The acid solution may comprise any suitable acid solution. Suitable acid solutions include, but are not limited to, an aqueous hydrochloric acid solution, an aqueous sulfuric acid solution, or an aqueous phosphoric acid solution.

The hydrophilic ionomeric polymer may be complexed using a complexing agent to form a cross-linked hydrophilic ionomeric polymer after drying the coated membrane and before applying the second layer of the aqueous solution. The hydrophilic ionomeric polymer-coated microporous support membrane is immersed in an aqueous solution of the complexing agent for a time in a range of 5 min to 24 h, or 5 min to 12 h, or 5 min to 8 h, or 10 min to 5 h, or 30 min to 1 h to complex the hydrophilic ionomeric polymer with the complexing agent. The MEA comprising the hydrophilic ionomeric polymer-coated microporous support membrane can also be complexed in situ with a complexing agent in a negative electrolyte, a positive electrolyte, or both the negative electrolyte and the positive electrolyte in a redox flow battery cell after the formation of the MEA.

Any suitable complexing agent that can complex with the hydrophilic ionomeric polymer to form a water insoluble cross-linked hydrophilic ionomeric polymer can be used. The water insoluble cross-linked hydrophilic ionomeric polymer coating layer provides the MEA with high stability under the RFB operating conditions. Suitable complexing agents include, but are not limited to, polyphosphoric acid, boric acid, a metal ion, or combinations thereof.

The anode may comprise a non-metallic or metallic electrode. Suitable non-metallic electrodes include, but are not limited to, a porous carbon felt, porous carbon paper, a porous carbon fiber paper, a carbon coated plastic mesh, or a carbon coated plastic felt. Suitable metallic electrodes include, but are not limited to, a Ti- or Fe-based electrode.

The MEA may be treated with an acid solution for about 10 min to about 48 h, or about 1 h to about 24 h, or about 1 h to about 12 h, at a temperature in a range of about 20° C. to about 80° C., or about 20° C. to about 60° C., and the MEA may be rinsed with deionized water. The treatment of the MEA in the acid solution either converts the first and/or the second layer of hydrophilic ionomeric polymer into water insoluble polymer coating layer or water insoluble acid-complexed polymer coating layer. The acid solution may comprise any suitable acid solution. Suitable acid solutions include, but are not limited to, an aqueous hydrochloric acid solution, an aqueous sulfuric acid solution, or an aqueous phosphoric acid solution.

In one embodiment, the method comprises applying a layer of a first solution comprising a hydrophilic ionomeric polymer to one surface of a microporous support membrane; drying the coated membrane to form a first hydrophilic ionomeric polymer coating layer on the microporous support membrane; treating the dried coated membrane by immersing it in an aqueous solution of polyphosphoric acid, boric acid, hydrochloric acid, or combinations thereof for a certain time at a certain temperature; rinsing the treated membrane with pure water; applying a layer of a second solution comprising a hydrophilic ionomeric polymer to a second surface of the microporous support membrane to form a second hydrophilic ionomeric polymer coating layer on the microporous support membrane; applying an electrode to the second surface of the second hydrophilic ionomeric polymer coating layer when the second hydrophilic ionomeric polymer coating layer is still wet to form a membrane electrode assembly; drying the membrane electrode assembly to adhere the electrode to the second surface of the second hydrophilic ionomeric polymer coating layer at a temperature in a range of about 40° C. to about 120° C., or in a range of about 50° C. to about 100° C. The dried membrane electrode assembly can be used as is in an all-iron RFB or can be treated by immersing it in an aqueous solution of polyphosphoric acid, boric acid, hydrochloric acid, or combinations thereof for a certain time before use.

In another embodiment, the method comprises applying a layer of a first solution comprising a hydrophilic ionomeric polymer to one surface of a microporous support membrane; drying the coated membrane to form a first hydrophilic ionomeric polymer coating layer on the microporous support membrane; applying a layer of a second solution comprising a hydrophilic ionomeric polymer to a second surface of the microporous support membrane to form a second hydrophilic ionomeric polymer coating layer on the microporous support membrane; applying an electrode to the second surface of the second hydrophilic ionomeric polymer coating layer when the second hydrophilic ionomeric polymer coating layer is still wet to form a membrane electrode assembly; drying the membrane electrode assembly to adhere the electrode to the second surface of the second hydrophilic ionomeric polymer coating layer at a temperature in a range of about 40° C. to about 120° C., or in a range of about 50° C. to about 100° C. The dried membrane electrode assembly can be used as is in an all-iron RFB or can be treated by immersing it in an aqueous solution of polyphosphoric acid, boric acid, hydrochloric acid, or combinations thereof for a certain time before use.

In yet another embodiment, the method comprises applying a layer of a first solution comprising a hydrophilic ionomeric polymer to one surface of a microporous support membrane; drying the coated membrane to form a first hydrophilic ionomeric polymer coating layer on the microporous support membrane; applying a layer of a second solution comprising a hydrophilic ionomeric polymer to a first surface of an electrode to form a hydrophilic ionomeric polymer coating layer on the first surface of the electrode; applying a second surface of the microporous support membrane to the second surface of the hydrophilic ionomeric polymer coating layer on the first surface of the electrode when the hydrophilic ionomeric polymer coating layer on the first surface of the electrode is still wet to form a membrane electrode assembly; drying the membrane electrode assembly to adhere the membrane to the second surface of the hydrophilic ionomeric polymer coating layer on the first surface of the electrode at a temperature in a range of about 40° C. to about 120° C., or in a range of about 50° C. to about 100° C. The dried membrane electrode assembly can be used as is in an all-iron RFB or can be treated by immersing it in an aqueous solution of polyphosphoric acid, boric acid, hydrochloric acid, or combinations thereof for a certain time before use.

Another aspect of the invention is a redox flow battery system. In one embodiment, the redox flow battery system comprises: at least one rechargeable cell comprising a positive electrolyte, a negative electrolyte, a membrane electrode assembly and a cathode positioned between the positive electrolyte and the negative electrolyte, wherein the membrane electrode assembly comprises: a microporous support membrane; a first hydrophilic ionomeric polymer coating layer comprising a first hydrophilic ionomeric polymer on a first surface of the microporous support membrane and a second hydrophilic ionomeric polymer coating layer comprising a second hydrophilic ionomeric polymer on a second surface of the microporous support membrane, and wherein the first and second coating layers are ionically conductive; and an anode adhered to the second coating layer; and wherein the anode is in contact with the negative electrolyte, and wherein the cathode is on the opposite side of the membrane electrode assembly from the anode, and wherein the cathode is in contact with the positive electrolyte.

The FIGURE illustrates one embodiment of the membrane electrode assembly 100 for the redox flow battery. The membrane electrode assembly 100 includes a microporous support membrane 105 having first and second surfaces 110 and 115. There is a first hydrophilic ionomeric polymer coating layer 120 on the first surface 110 of the microporous support membrane 105. There is a second hydrophilic ionomeric polymer coating layer 125 of the second surface 115 of the microporous support membrane 105. An anode 130 is adhered to a second surface 135 of the second hydrophilic ionomeric polymer coating layer 125 on the side opposite the microporous support layer 105. The first hydrophilic ionomeric polymer 140 is present in the pores of the microporous support membrane 105.

EXAMPLES

The following examples are provided to illustrate one or more preferred embodiments of the invention but are not limited embodiments thereof. Numerous variations can be made to the following examples that lie within the scope of the invention.

Example 1. Preparation of Alginic Acid/Daramic®/Alginic Acid/Carbon Felt Membrane Electrode Assembly (Abbreviated as AA/D/AA/CF MEA)

A 6.5 wt % sodium alginate aqueous solution was prepared by dissolving sodium alginate polymer in DI water. One surface of a Daramic® microporous support membrane purchased from Daramic, LLC was coated with a thin layer of the 6.5 wt % sodium alginate aqueous solution and dried at 60° C. for 2 h in an oven to form a sodium alginate layer on the first surface of the Daramic® support membrane. The dried sodium alginate-coated Daramic® membrane was treated with 1 M HCl for 2 h to convert the sodium alginate coating layer to an alginic acid coating layer. The alginic acid-coated Daramic® membrane (abbreviated as AA/D membrane) was rinsed with DI water 3 times and taped on a glass plate with the alginic acid coating layer facing down to contact the glass plate and the second surface of the porous Daramic® support membrane facing up. A 6.5 wt % sodium alginate aqueous solution was coated onto the second surface of the Daramic® support membrane using a knife casting method. A carbon felt electrode of the desired size was applied to the wet sodium alginate coating layer surface to form the membrane electrode assembly (MEA). The MEA was dried on a hot plate at 60° C. for 1 h to allow the carbon felt electrode to adhere to the second surface of the Daramic® porous support membrane with sodium alginate as the adhesive. After drying, the MEA was treated with 1 M HCl for 2 h to convert sodium alginate coating layer and sodium alginate adhesive layer to alginic acid coating layer and alginic acid adhesive layer. The treated MEA was rinsed with DI water 3 times to form alginic acid/Daramic®/alginic acid/carbon felt membrane electrode assembly (abbreviated as AA/D/AA/CF MEA) before battery testing.

Example 2. Preparation of Alginic Acid/Daramic®/Sodium Alginate/Carbon Felt Membrane Electrode Assembly (Abbreviated as AA/D/NaA/CF MEA)

A 6.5 wt % sodium alginate aqueous solution was prepared by dissolving sodium alginate polymer in DI water. One surface of a Daramic® microporous support membrane purchased from Daramic, LLC was coated with a thin layer of the 6.5 wt % sodium alginate aqueous solution and dried at 60° C. for 2 h in an oven to form a sodium alginate layer on the first surface of the Daramic® support membrane. The dried sodium alginate-coated Daramic® membrane was treated with 1 M HCl for 2 h to convert the sodium alginate coating layer to an alginic acid coating layer. The alginic acid-coated Daramic® membrane (abbreviated as AA/D membrane) was rinsed with DI water 3 times and taped on a glass plate with the alginic acid coating layer facing down to contact the glass plate and the second surface of the porous Daramic® support membrane facing up. A 6.5 wt % sodium alginate aqueous solution was coated onto the second surface of the Daramic® support membrane using a knife casting method. A carbon felt electrode of the desired size was applied to the wet sodium alginate coating layer surface to form the membrane electrode assembly (MEA). The MEA was dried on a hot plate at 60° C. for 1 h to allow the carbon felt electrode to adhere to the second surface of the Daramic® porous support membrane with sodium alginate as the adhesive to form alginic acid/Daramic®/sodium alginate/carbon felt membrane electrode assembly (abbreviated as AA/D/NaA/CF MEA) before battery testing.

Example 3: All-Iron Redox Flow Battery Performance Study on AA/D/AA/CF MEA, AA/D/NaA/CF MEA, and AA/D Membrane The ionic conductivity, number of battery charge/discharge cycles, VE, CE, and EE of the all-iron redox flow batteries comprising AA/D/AA/CF MEA as described in Example 1, AA/D/NaA/CF MEA as described in Example 2, and AA/D membrane without the carbon felt adhered to the second surface of the Daramic® microporous support membrane using sodium alginate as the adhesive, respectively, were evaluated. The performance was measured using EIS with a BCS-810 battery cycling system (Biologic, FRANCE) at room temperature. All the batteries used the same electrolyte formula comprising a positive electrolyte solution and a negative electrolyte solution. The positive electrolyte solution comprised 1.5 M $FeCl_2$, 3.5 M $NH_4Cl$, 0.2 M HCl, 0.1 M boric acid, and 0.2 M glycine in ultrapure water (18.2 MΩ·cm), and the pH of the solution was 0.7. The negative solution comprised 1.5 M $FeCl_2$, 3.5 M $NH_4Cl$, 0.06 M HCl, 0.1 M boric acid, and 0.2 M glycine in ultrapure water (18.2 MΩ·cm), and the pH of the solution was 1.7. The battery cell assembly comprising AA/D/AA/CF MEA and a carbon felt positive electrode was assembled with the carbon felt positive electrode contacting the alginic acid coating layer and the positive electrolyte, and the carbon felt on the AA/D/AA/CF MEA as the negative electrode to contact with the negative electrolyte. The battery cell assembly comprising AA/D/NaA/CF MEA and a carbon felt positive electrode was assembled with the carbon felt positive electrode contacting the alginic acid coating layer and the positive electrolyte, and the carbon felt on the AA/D/NaA/CF MEA as the negative electrode to contact with the negative electrolyte. The battery cell assembly comprising AA/D membrane, a carbon felt negative electrode, and a carbon felt positive electrode was assembled with the carbon felt positive electrode contacting the alginic acid coating layer and the positive electrolyte, and the carbon felt negative electrode contacting the negative electrolyte and the uncoated surface of the Daramic® microporous support membrane without sodium alginate adhesive between the carbon felt negative electrode and the Daramic® microporous support membrane.

The results are shown in Table 1. It can be seen from Table 1 that AA/D/AA/CF and AA/D/NaA/CF MEAs showed much lower area specific resistance, longer battery cycles, and higher VE, CE, and EE than AA/D membrane assembled with a negative electrode without any sodium alginate adhesive between the membrane and the negative electrode. These results confirmed that the AA/D/AA/CF and AA/D/NaA/CF MEAs significantly improved the membrane performance compared to AA/D membrane assembled with a negative electrode without any sodium alginate adhesive between the membrane and the negative electrode.

TABLE 1

All-Iron Redox Flow Battery Performance Measurements on on AA/D/AA/CF MEA, AA/D/NaA/CF MEA, and AA/D membrane [a]

| Membrane or MEA | Area Specific Resistance (Ω · cm$^2$) | # Cycles | VE (%) | CE (%) | EE (%) |
| --- | --- | --- | --- | --- | --- |
| AA/D/AA/CF MEA | 0.86 | 28 | 74.7 | 93.5 | 69.8 |
| AA/D/NaA/CF MEA | 0.62 | 29 | 74.3 | 94.8 | 70.4 |
| AA/D membrane | 1.45 | 24 | 69.3 | 91.3 | 63.3 |

[a] Charge current density: 30 mA/cm$^2$; charge time: 4 h; discharge current density: 30 mA/cm$^2$; discharge time: 4 h; # of cycles were counted with ≥70% CE.

By the term "about," we mean within plus or minus 10% of the value specified, or within plus or minus 5%, or within plus or minus 1%.

SPECIFIC EMBODIMENTS

While the following is described in conjunction with specific embodiments, it will be understood that this description is intended to illustrate and not limit the scope of the preceding description and the appended claims.

A first embodiment of the invention is a membrane electrode assembly for a redox flow battery comprising a microporous support membrane; a first hydrophilic ionomeric polymer coating layer comprising a first hydrophilic ionomeric polymer on a first surface of the microporous support membrane and a second hydrophilic ionomeric polymer coating layer comprising a second hydrophilic ionomeric polymer on a second surface of the microporous support membrane, and wherein the first and second coating layers are ionically conductive; and an anode adhered to the second hydrophilic polymer coating layer. An embodiment of the invention is one, any or all of prior embodiments in this paragraph up through the first embodiment in this paragraph wherein at least one of the first and second hydrophilic ionomeric polymers comprises a polysaccharide polymer, a polyphosphoric acid-complexed polysaccharide polymer, a polyphosphoric acid and metal ion-complexed polysaccharide polymer, a metal ion-complexed polysaccharide polymer, a boric acid-complexed polysaccharide polymer, a boric acid-complexed polyvinyl alcohol polymer, polyphosphoric acid-complexed polyvinyl alcohol polymer, a polyphosphoric acid and metal ion-complexed polyvinyl alcohol polymer, a metal ion-complexed polyvinyl alcohol polymer, a metal ion-complexed poly(acrylic acid) polymer, a boric acid-complexed poly(acrylic acid) polymer, a metal ion-complexed poly(methacrylic acid), a boric acid-complexed poly(methacrylic acid), or combinations thereof. An embodiment of the invention is one, any or all of prior embodiments in this paragraph up through the first embodiment in this paragraph wherein the polysaccharide polymer comprises chitosan, sodium alginate, potassium alginate, calcium alginate, ammonium alginate, alginic acid, sodium hyaluronate, potassium hyaluronate, calcium hyaluronate, ammonium hyaluronate, hyaluronic acid, dextran, pullulan, carboxymethyl curdlan, sodium carboxymethyl curdlan, potassium carboxymethyl curdlan, calcium carboxymethyl curdlan, ammonium carboxymethyl curdlan, κ-carrageenan, λ-carrageenan, ι-carrageenan, carboxymethyl cellulose, sodium carboxymethyl cellulose, potassium carboxymethyl cellulose, calcium carboxymethyl cellulose, ammonium carboxymethyl cellulose, pectic acid, chitin, chondroitin, xanthan gum, or combinations thereof. An embodiment of the invention is one, any or all of prior embodiments in this paragraph up through the first embodiment in this paragraph wherein the metal ion comprises ferric ion, ferrous ion, zinc ion, or vanadium ion. An embodiment of the invention is one, any or all of prior embodiments in this paragraph up through the first embodiment in this paragraph wherein at least one of the first and second hydrophilic ionomeric polymers comprises a polyphosphoric acid-complexed chitosan polymer, a polyphosphoric acid and metal ion-complexed chitosan polymer, a metal ion-complexed alginic acid polymer, a sodium alginate polymer, an alginic acid polymer, a hyaluronic acid polymer, a poly(acrylic acid) polymer, a poly(methacrylic acid) polymer, or combinations thereof. An embodiment of the invention is one, any or all of prior embodiments in this paragraph up through the first embodiment in this paragraph wherein at least one of the first and second hydrophilic ionomeric polymers comprises a boric acid-complexed polyvinyl alcohol polymer, a boric acid-complexed alginic acid, or a blend of boric acid-complexed polyvinyl alcohol and alginic acid polymer. An embodiment of the invention is one, any or all of prior embodiments in this paragraph up through the first embodiment in this paragraph wherein the support membrane comprises polyethylene, polypropylene, poly(ethylene-co-propylene), polyamide, polyacrylonitrile, polyethersulfone, sulfonated polyethersulfone, polysulfone, sulfonated polysulfone, poly(ether ether ketone), sulfonated poly(ether ether ketone), polyester, cellulose acetate, cellulose triacetate, polybenzimidazole, polyimide, polyvinylidene fluoride, polycarbonate, cellulose, or combinations thereof. An embodiment of the invention is one, any or all of prior embodiments in this paragraph up through the first embodiment in this paragraph wherein at least one of the first and second hydrophilic ionomeric polymer is present in the micropores of the support membrane. An embodiment of the invention is one, any or all of prior embodiments in this paragraph up through the first embodiment in this paragraph wherein the first hydrophilic ionomeric polymer is the same as the second hydrophilic ionomeric polymer.

A second embodiment of the invention is a method of preparing a membrane electrode assembly comprising applying a first layer of an aqueous solution comprising a first hydrophilic ionomeric polymer to a first surface of a microporous support membrane; drying the coated membrane; applying a second layer of an aqueous solution comprising a second hydrophilic ionomeric polymer to a second surface of the microporous support membrane; applying an anode to the second layer while the second layer is wet; drying the membrane electrode assembly, and optionally, treating the dried membrane electrode assembly with an acid solution and rinse with deionized water. An embodiment of the invention is one, any or all of prior embodiments in this paragraph up through the second embodiment in this paragraph wherein the first hydrophilic ionomeric polymer is the same as the second hydrophilic ionomeric polymer. An embodiment of the invention is one, any or all of prior embodiments in this paragraph up through the second embodiment in this paragraph wherein at least one of the first and second the hydrophilic ionomeric polymers comprises a polysaccharide polymer, a poly(acrylic acid) polymer, a poly(methacrylic acid), or combinations thereof. An embodiment of the invention is one, any or all of prior embodiments in this paragraph up through the second embodiment in this paragraph wherein the polysaccharide polymer comprises chitosan, sodium alginate, potassium alginate, calcium alginate, ammonium alginate, alginic acid, sodium hyaluronate, potassium hyaluronate, calcium hyaluronate, ammonium hyaluronate, hyaluronic acid, dextran, pullulan, carboxymethyl curdlan, sodium carboxymethyl curdlan, potassium carboxymethyl curdlan, calcium carboxymethyl curdlan, ammonium carboxymethyl curdlan, κ-carrageenan, λ-carrageenan, ι-carrageenan, carboxymethyl cellulose, sodium carboxymethyl cellulose, potassium carboxymethyl cellulose, calcium carboxymethyl cellulose, ammonium carboxymethyl cellulose, pectic acid, chitin, chondroitin, xanthan gum, or combinations thereof. An embodiment of the invention is one, any or all of prior embodiments in this paragraph up through the second embodiment in this paragraph further comprising treating the coated membrane with an acid solution and rinsing the membrane with deionized water after drying the coated membrane and before applying the second layer of the aqueous solution. An embodiment of the invention is one, any or all of prior embodiments in this paragraph up through the second embodiment in this paragraph wherein the acid solution comprises an aqueous hydrochloric acid solution, an aqueous sulfuric acid solution, or an aqueous phosphoric acid solution. An embodiment of the invention is one, any or all of prior embodiments in this paragraph up through the second embodiment in this paragraph wherein the anode comprises a non-metallic or metallic electrode. An embodiment of the invention is one, any or all of prior embodiments in this paragraph up through the second embodiment in this paragraph wherein the non-metallic electrode comprises a porous carbon felt, porous carbon paper, a porous carbon fiber paper, a carbon coated plastic mesh, or a carbon coated plastic felt. An embodiment of the invention is one, any or all of prior embodiments in this paragraph up through the second embodiment in this paragraph wherein the metallic electrode is a Ti- or Fe-based electrode. An embodiment of the invention is one, any or all of prior embodiments in this paragraph up through the second embodiment in this paragraph further comprising complexing the hydrophilic ionomeric polymer using a complexing agent to form a cross-linked hydrophilic ionomeric polymer after drying the coated membrane and before applying the second layer of the aqueous solution.

A third embodiment of the invention is a redox flow battery system, comprising at least one rechargeable cell comprising a positive electrolyte, a negative electrolyte, a membrane electrode assembly and a cathode positioned between the positive electrolyte and the negative electrolyte, wherein the membrane electrode assembly comprises a microporous support membrane; a first hydrophilic ionomeric polymer coating layer comprising a first hydrophilic ionomeric polymer on a first surface of the microporous support membrane and a second hydrophilic ionomeric polymer coating layer comprising a second hydrophilic ionomeric polymer on a second surface of the microporous support membrane, and wherein the first and second coating layers are ionically conductive; and an anode adhered to the second coating layer; and wherein the anode is in contact with the negative electrolyte, and wherein the cathode is on the opposite side of the membrane electrode assembly from the anode, and wherein the cathode is in contact with the positive electrolyte.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A membrane electrode assembly for a redox flow battery comprising: a microporous support membrane; a first hydrophilic ionomeric polymer coating layer comprising a first hydrophilic ionomeric polymer on a first surface of the microporous support membrane and a second hydrophilic ionomeric polymer coating layer comprising a second hydrophilic ionomeric polymer on a second surface of the microporous support membrane, and wherein the first and second coating layers are ionically conductive; and an anode adhered to the second hydrophilic polymer coating layer by applying the anode to the second surface of the second hydrophilic ionomeric polymer coating layer when the second hydrophilic ionomeric polymer coating layer is wet.

2. The membrane electrode assembly of claim 1 wherein at least one of the first and second hydrophilic ionomeric polymers comprises a polysaccharide polymer, a polyphosphoric acid-complexed polysaccharide polymer, a polyphosphoric acid and metal ion-complexed polysaccharide polymer, a metal ion-complexed polysaccharide polymer, a boric acid-complexed polysaccharide polymer, a boric acid-complexed polyvinyl alcohol polymer, polyphosphoric acid-complexed polyvinyl alcohol polymer, a polyphosphoric acid and metal ion-complexed polyvinyl alcohol polymer, a metal ion-complexed polyvinyl alcohol polymer, a metal ion-complexed poly(acrylic acid) polymer, a boric acid-complexed poly(acrylic acid) polymer, a metal ion-complexed poly(methacrylic acid), a boric acid-complexed poly(methacrylic acid), or combinations thereof.

3. The membrane electrode assembly of claim 2 wherein the polysaccharide polymer comprises chitosan, sodium alginate, potassium alginate, calcium alginate, ammonium alginate, alginic acid, sodium hyaluronate, potassium hyaluronate, calcium hyaluronate, ammonium hyaluronate, hyaluronic acid, dextran, pullulan, carboxymethyl curdlan, sodium carboxymethyl curdlan, potassium carboxymethyl curdlan, calcium carboxymethyl curdlan, ammonium carboxymethyl curdlan, κ-carrageenan, λ-carrageenan, t-carrageenan, carboxymethyl cellulose, sodium carboxymethyl cellulose, potassium carboxymethyl cellulose, calcium carboxymethyl cellulose, ammonium carboxymethyl cellulose, pectic acid, chitin, chondroitin, xanthan gum, or combinations thereof.

4. The membrane electrode assembly of claim 2 wherein the metal ion comprises ferric ion, ferrous ion, zinc ion, or vanadium ion.

5. The membrane electrode assembly of claim 1 wherein at least one of the first and second hydrophilic ionomeric polymers comprises a polyphosphoric acid-complexed chitosan polymer, a polyphosphoric acid and metal ion-complexed chitosan polymer, a metal ion-complexed alginic acid polymer, a sodium alginate polymer, an alginic acid polymer, a hyaluronic acid polymer, a poly(acrylic acid) polymer, a poly(methacrylic acid) polymer, or combinations thereof.

6. The membrane electrode assembly of claim 1 wherein at least one of the first and second hydrophilic ionomeric polymers comprises a boric acid-complexed polyvinyl alcohol polymer, a boric acid-complexed alginic acid, or a blend of boric acid-complexed polyvinyl alcohol and alginic acid polymer.

7. The membrane electrode assembly of claim 1 wherein the support membrane comprises polyethylene, polypropylene, poly(ethylene-co-propylene), polyamide, polyacrylonitrile, polyethersulfone, sulfonated polyethersulfone, polysulfone, sulfonated polysulfone, poly(ether ether ketone), sulfonated poly(ether ether ketone), polyester, cellulose acetate, cellulose triacetate, polybenzimidazole, polyimide, polyvinylidene fluoride, polycarbonate, cellulose, or combinations thereof.

8. The membrane electrode assembly of claim 1 wherein at least one of the first and second hydrophilic ionomeric polymer is present in the micropores of the support membrane.

9. The membrane electrode assembly of claim 1 wherein the first hydrophilic ionomeric polymer is the same as the second hydrophilic ionomeric polymer.

10. A method of preparing a membrane electrode assembly comprising:
    applying a first layer of an aqueous solution comprising a first hydrophilic ionomeric polymer to a first surface of a microporous support membrane;
    drying the coated membrane;
    applying a second layer of an aqueous solution comprising a second hydrophilic ionomeric polymer to a second surface of the microporous support membrane;
    applying an anode to the second layer while the second layer is wet;
    drying the membrane electrode assembly, and
    optionally, treating the dried membrane electrode assembly with an acid solution and rinse with deionized water.

11. The method of claim 10 wherein the first hydrophilic ionomeric polymer is the same as the second hydrophilic ionomeric polymer.

12. The method of claim 10 wherein at least one of the first and second the hydrophilic ionomeric polymers comprises a polysaccharide polymer, a poly(acrylic acid) polymer, a poly(methacrylic acid), or combinations thereof.

13. The method of claim 12 wherein the polysaccharide polymer comprises chitosan, sodium alginate, potassium alginate, calcium alginate, ammonium alginate, alginic acid, sodium hyaluronate, potassium hyaluronate, calcium hyaluronate, ammonium hyaluronate, hyaluronic acid, dextran, pullulan, carboxymethyl curdlan, sodium carboxymethyl curdlan, potassium carboxymethyl curdlan, calcium carboxymethyl curdlan, ammonium carboxymethyl curdlan, κ-carrageenan, λ-carrageenan, t-carrageenan, carboxymethyl cellulose, sodium carboxymethyl cellulose, potassium carboxymethyl cellulose, calcium carboxymethyl cellulose, ammonium carboxymethyl cellulose, pectic acid, chitin, chondroitin, xanthan gum, or combinations thereof.

14. The method of claim 10 further comprising:
    treating the coated membrane with an acid solution and rinsing the membrane with deionized water after drying the coated membrane and before applying the second layer of the aqueous solution.

15. The method of claim 14 wherein the acid solution comprises an aqueous hydrochloric acid solution, an aqueous sulfuric acid solution, or an aqueous phosphoric acid solution.

16. The method of claim 10 wherein the anode comprises a non-metallic or metallic electrode.

17. The method of claim 16 wherein the non-metallic electrode comprises a porous carbon felt, porous carbon paper, a porous carbon fiber paper, a carbon coated plastic mesh, or a carbon coated plastic felt.

18. The method of claim 16 wherein the metallic electrode is a Ti- or Fe-based electrode.

19. The method of claim 10 further comprising:
complexing the hydrophilic ionomeric polymer using a complexing agent to form a cross-linked hydrophilic ionomeric polymer after drying the coated membrane and before applying the second layer of the aqueous solution.

20. A redox flow battery system, comprising: at least one rechargeable cell comprising a positive electrolyte, a negative electrolyte, a membrane electrode assembly and a cathode positioned between the positive electrolyte and the negative electrolyte, wherein the membrane electrode assembly comprises: a microporous support membrane; a first hydrophilic ionomeric polymer coating layer comprising a first hydrophilic ionomeric polymer on a first surface of the microporous support membrane and a second hydrophilic ionomeric polymer coating layer comprising a second hydrophilic ionomeric polymer on a second surface of the microporous support membrane, and wherein the first and second coating layers are ionically conductive; and an anode adhered to the second coating layer by applying the anode to the second surface of the second hydrophilic ionomeric polymer coating layer when the second hydrophilic ionomeric polymer coating layer is wet; and wherein the anode is in contact with the negative electrolyte, and wherein the cathode is on the opposite side of the membrane electrode assembly from the anode, and wherein the cathode is in contact with the positive electrolyte.

* * * * *